Aug. 16, 1966  A. C. KOLB ET AL  3,267,305
HIGH CURRENT COLLECTOR PLATE

Filed Nov. 30, 1962  7 Sheets-Sheet 1

INVENTORS
ALAN C. KOLB
JAMES M. FRAME
CLAUDE C. MARTIN

FIG_2

INVENTORS
ALAN C. KOLB
JAMES M. FRAME
BY CLAUDE C. MARTIN

Aug. 16, 1966  A. C. KOLB ET AL  3,267,305
HIGH CURRENT COLLECTOR PLATE
Filed Nov. 30, 1962  7 Sheets-Sheet 4

INVENTORS
ALAN C. KOLB
JAMES M. FRAME
BY CLAUDE C. MARTIN

ATTORNEY

INVENTORS
ALAN C. KOLB
JAMES M. FRAME
BY CLAUDE C. MARTIN

ATTORNEY

Aug. 16, 1966   A. C. KOLB ET AL   3,267,305
HIGH CURRENT COLLECTOR PLATE
Filed Nov. 30, 1962   7 Sheets-Sheet 6
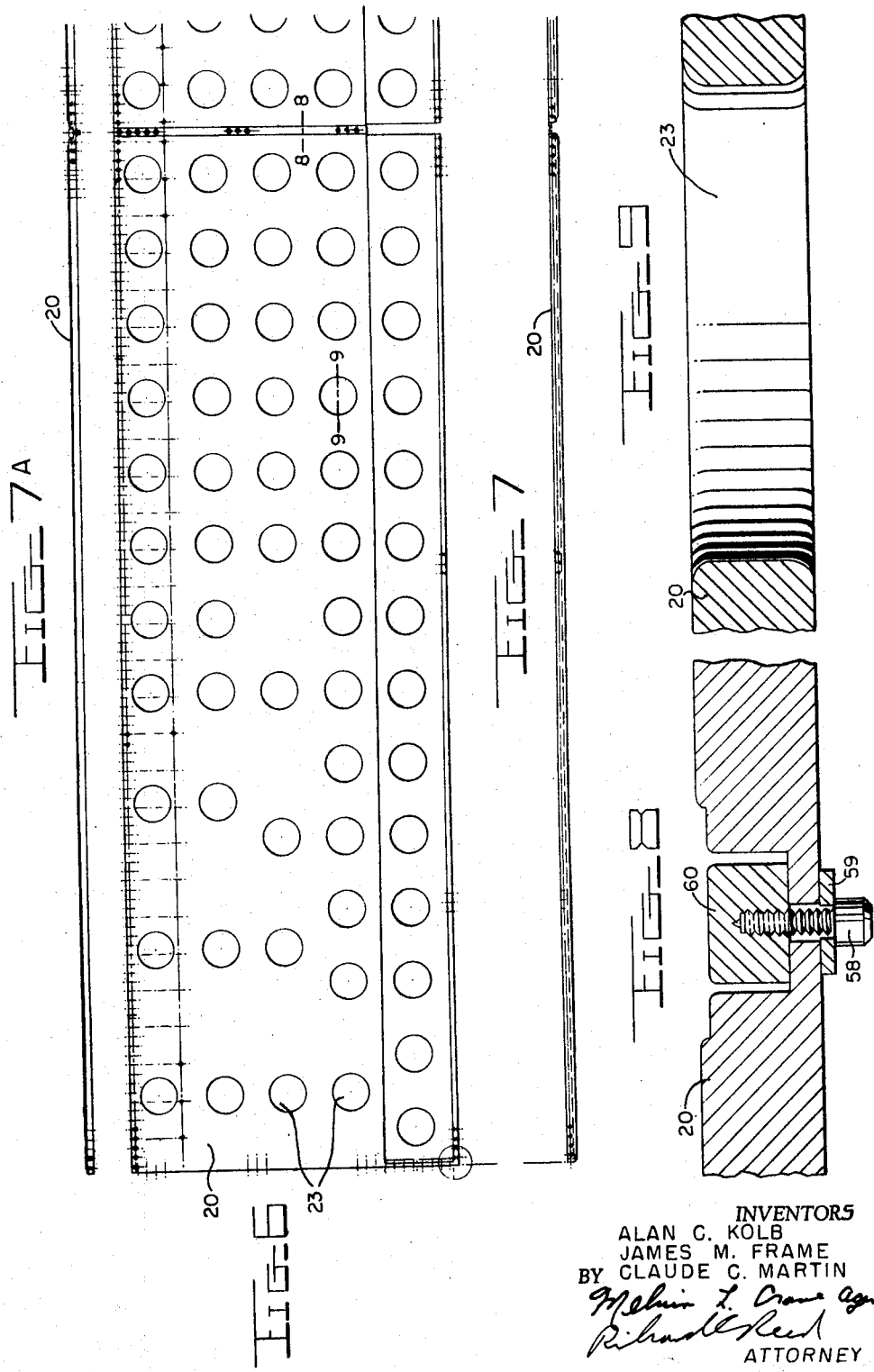
INVENTORS
ALAN C. KOLB
JAMES M. FRAME
BY CLAUDE C. MARTIN
ATTORNEY

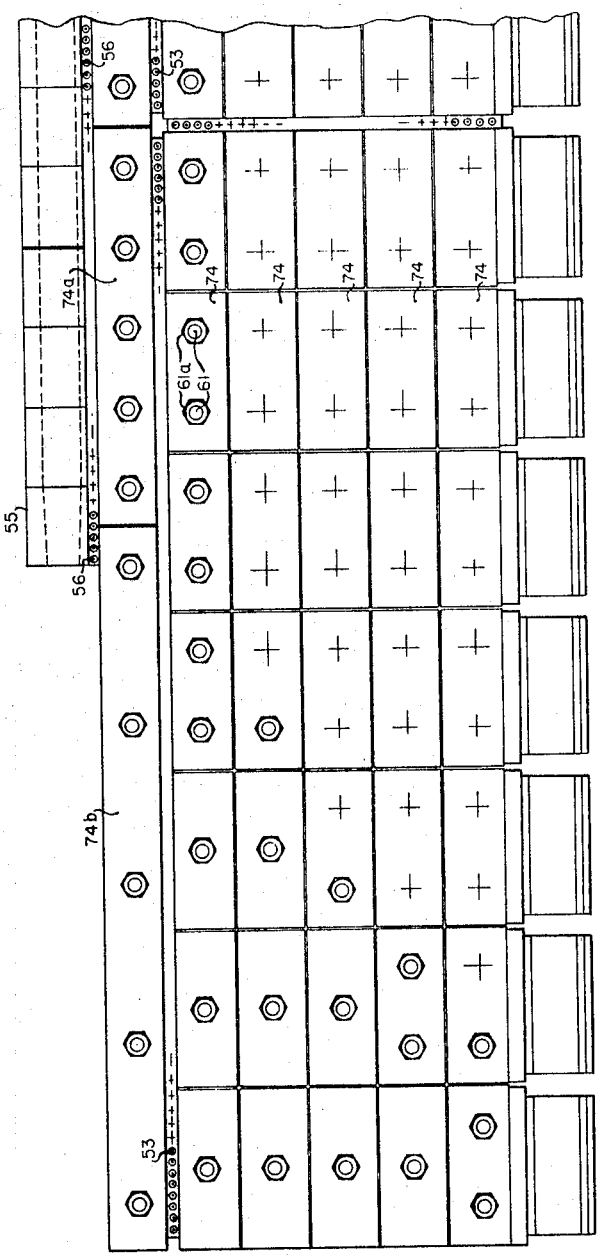

3,267,305
HIGH CURRENT COLLECTOR PLATE
Alan C. Kolb, Landover, James M. Frame, Forestville, and Claude C. Martin, Temple Hills, Md., assignors to the United States of America as represented by the Secretary of the Navy
Filed Nov. 30, 1962, Ser. No. 241,453
5 Claims. (Cl. 307—147)

The invention described herein may be manufactured and used by or for the Government of the United States of America for governmental purposes without the payment of any royalties thereon or therefor.

The present invention relates to current collector plates which collect current from a plurality of electrical sources and more particularly, to a high current collector plate which is of low inductance and capable of conducting very high currents.

Heretofore current collector plates have been used for conducting a high current from relatively high energy sources to a load. Such collector plates have been spaced from each other sufficiently to prevent a spark breakdown between the plates or the plates have been secured close to each other with sufficient insulation between the plates to prevent an electrical breakdown between the plates. It is well known that a current flow through a conductor creates a magnetic field about the conductor. High currents produce high strength magnetic fields which tend to separate the collector plates. To avoid separation of the collector plates, some means must be used to prevent the separation. Not only is one concerned with separation of the collector plates but means for connecting the sources to the plates and then connecting the plates to a load must be taken into consideration.

It is therefore an object of the present invention to provide a current collector plate assembly which is of simple construction, rugged, and capable of safely passing large currents.

Another object is to provide current collector plates which may be used with a high energy source for conducting large current loads.

Still another object is to provide current collector plates which are capable of withstanding transient potentials of an energy source in the megajoule range.

Yet another object is to provide a high current collector plate assembly having the mechanical strength to permit production of magnetic fields of several hundred kilogauss.

Other and more specific objects of the invention will become apparent upon a careful consideration of the following detailed description when taken together with the accompanying drawings in which:

FIG. 6 illustrates a top view of slightly more than one-half of the upper conductor plate;

FIGS. 7 and 7A illustrate side views of the upper conductor plate shown in FIG. 6;

FIG. 8 illustrates the actual size of the connection between the two plate sections which constitute the upper conductor plate;

FIG. 9 illustrates in cross section the actual size of the holes in the upper conductor plate and the shape of the outer edges of the holes; and FIG. 10 illustrates a partial top view of the conductor plate assembly.

Figure 1:
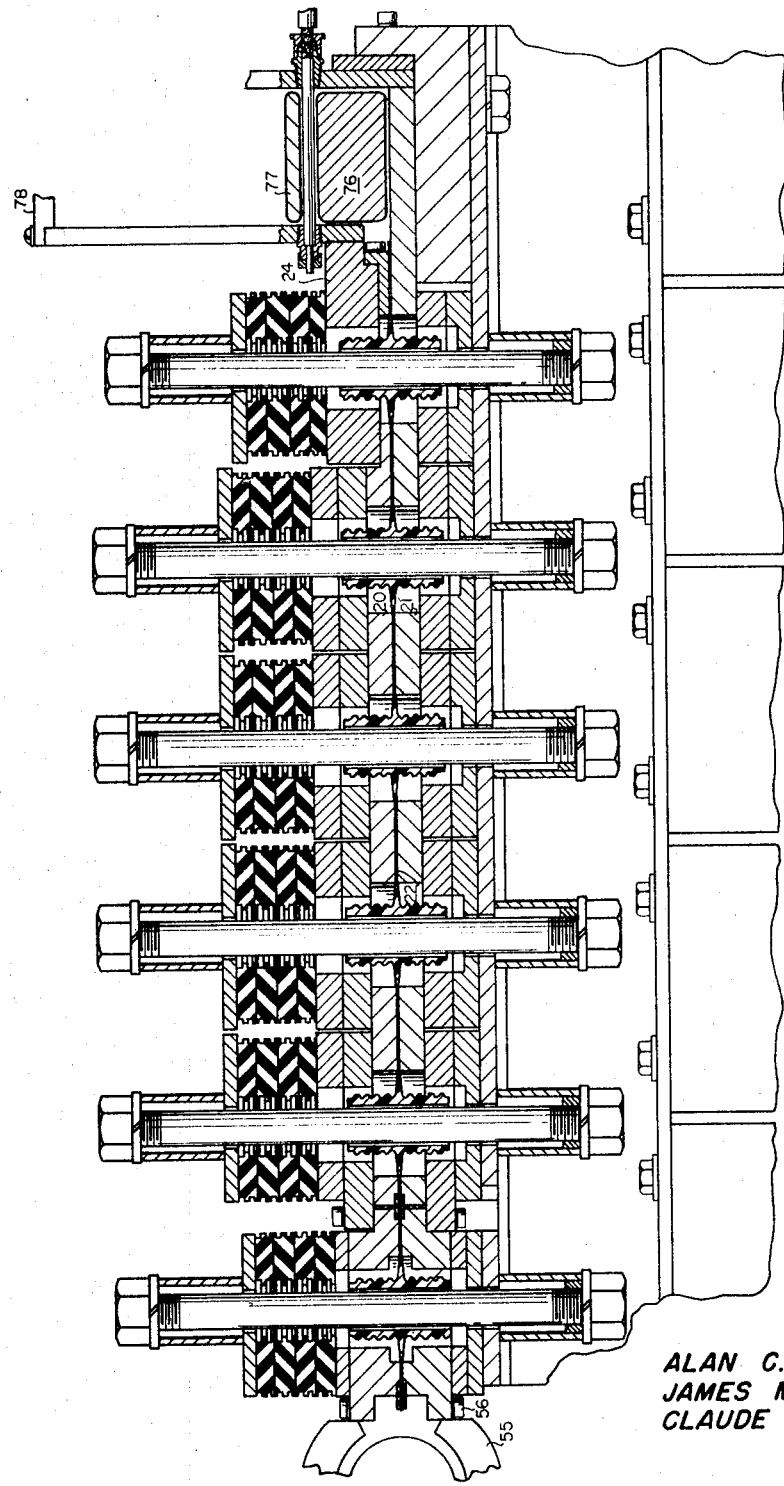
FIG. 1 illustrates a cross sectional view of the collector plate and structure required to assemble the plates for high current operation.
Figure 2:
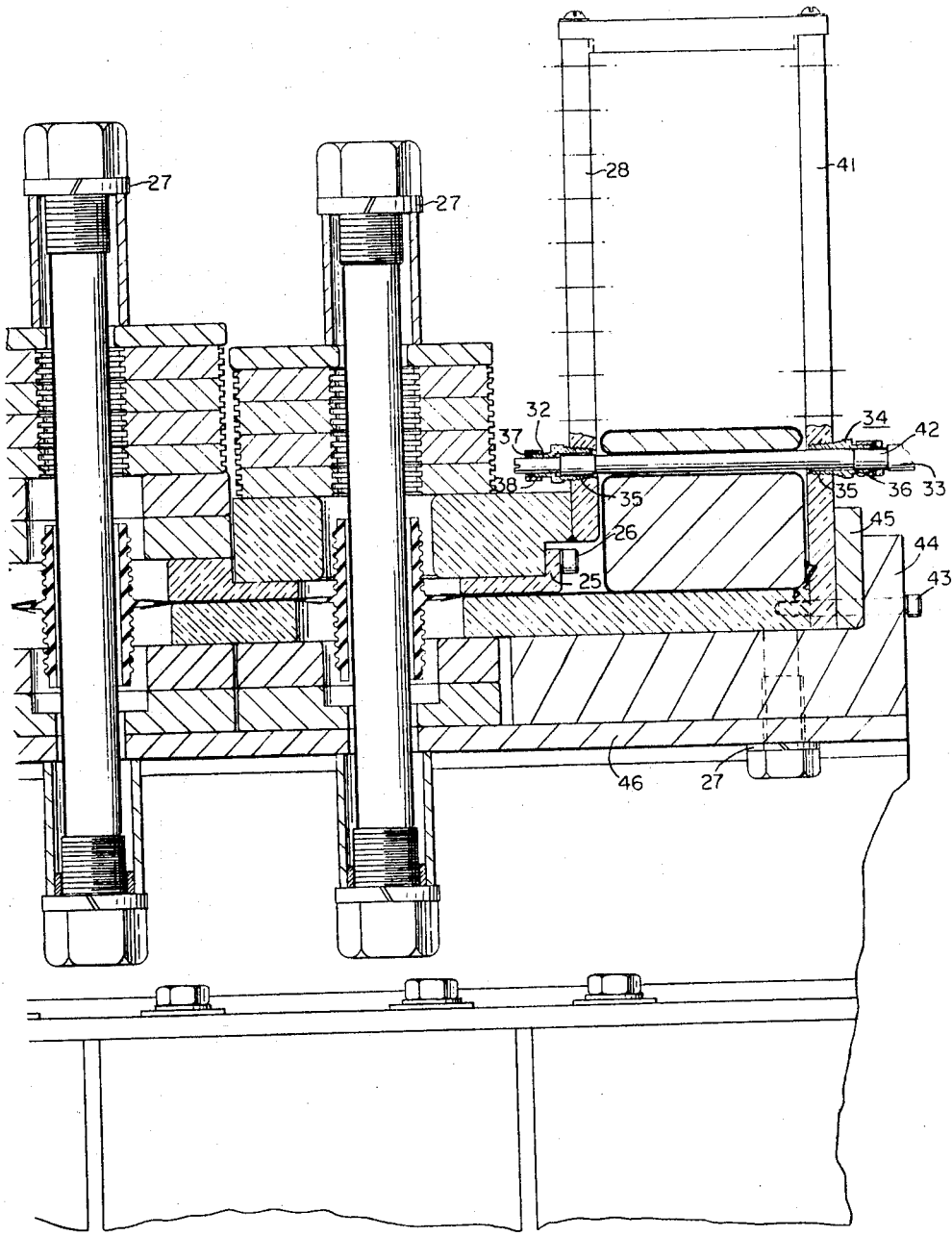
FIG. 2 is a partial cross sectional view illustrating the electrical connection between one end of the conductor plates and the terminals to which a source is connected.
Figure 3:
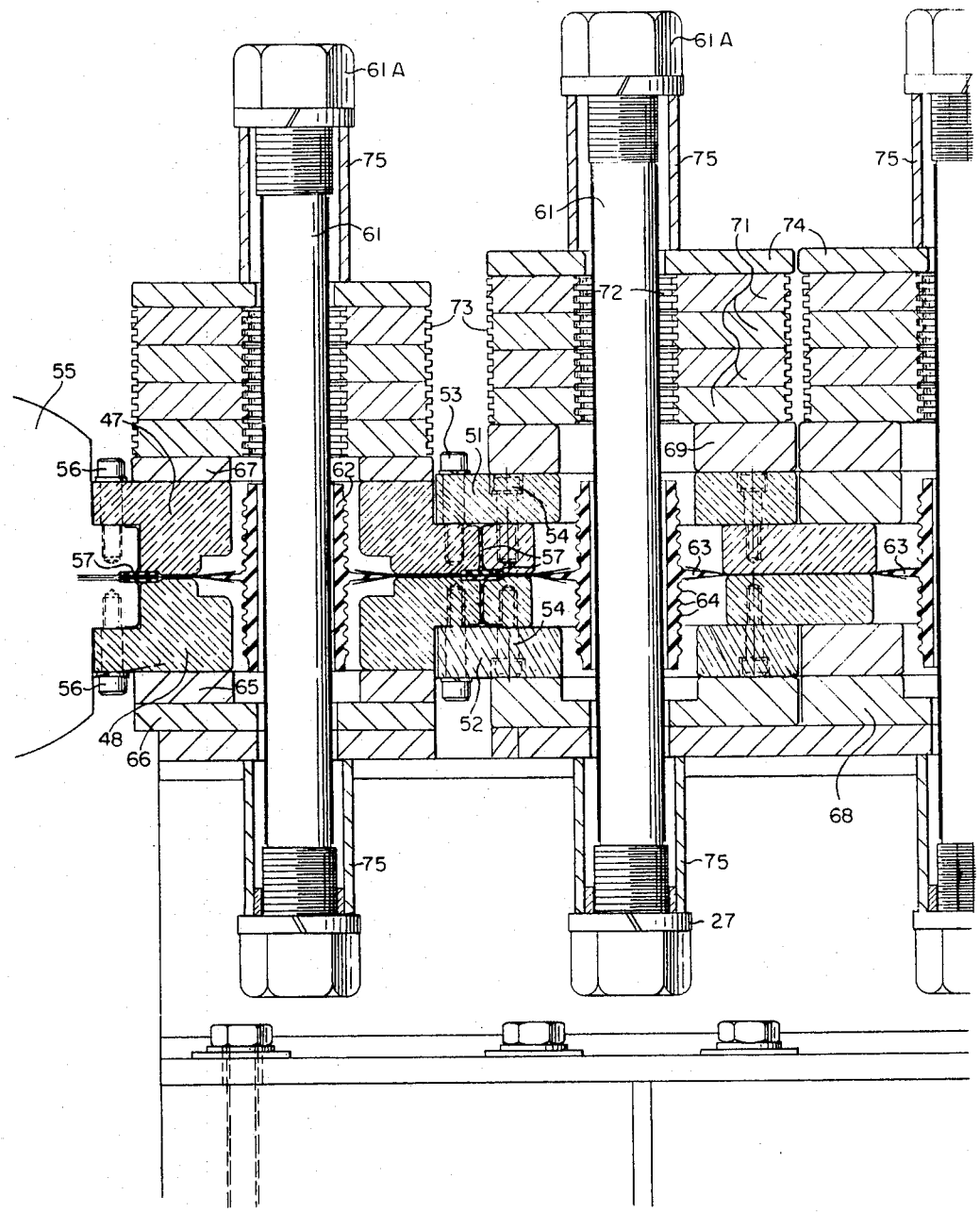
FIG. 3 is a partial cross sectional view illustrating the electrical connection between the conductor plates and a load.
Figure 4:
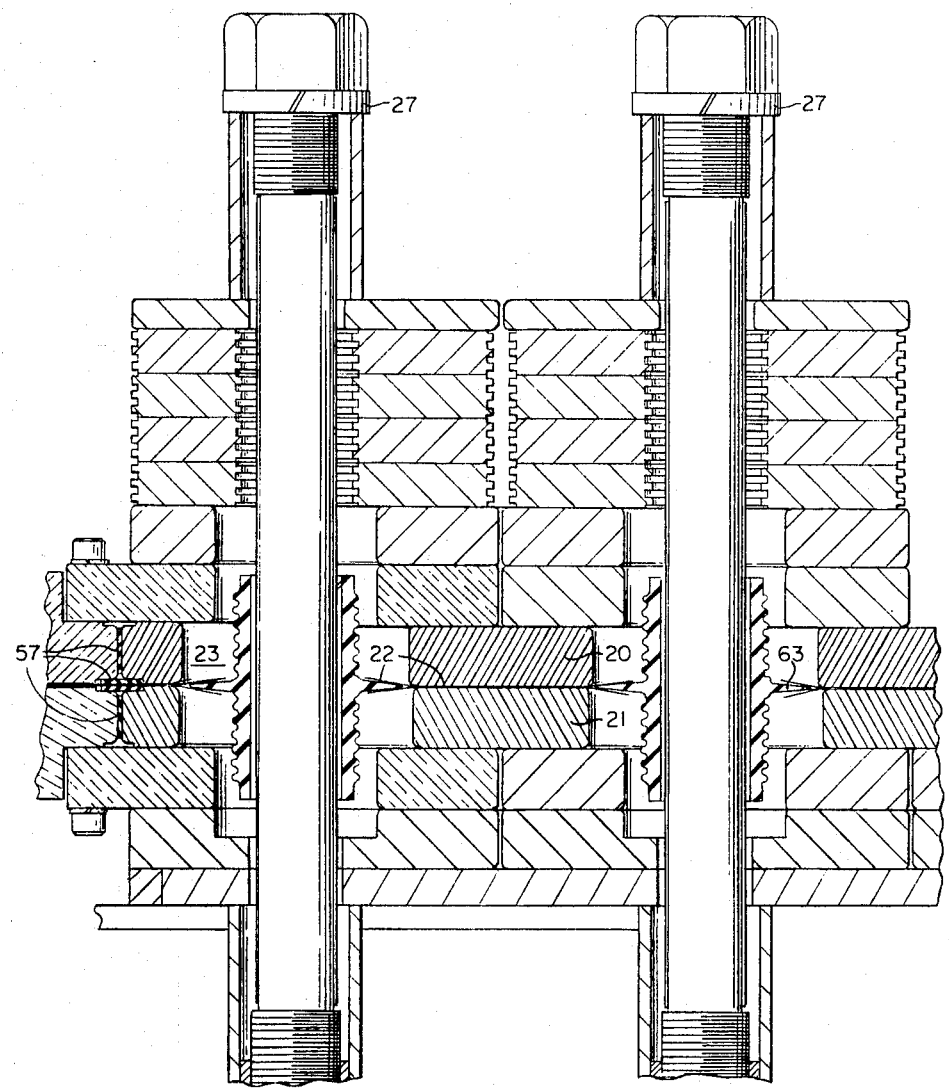
FIG. 4 is a partial cross sectional view illustrating the manner in which the assembly is secured together.

The collector plate assembly comprises a pair of parallel flat plate conductors such as copper or brass separated by suitable insulation such as Mylar. The parallel conductor plates are each connected at one end to a plurality of linearly aligned terminal plates which have connected thereto a plurality of coaxial cables that are connected to a capacitor bank. The opposite ends of the conductor plates are connected by suitable parallel terminal bars to a single turn coil. A high current is brought in through the coaxial cables to the high-voltage side of the terminal plate, then through the upper conductor to the single turn coil, back through the lower conductor to the ground side terminal connected thereto and then through the ground side of the coaxial cable back to the source.

Due to high currents passing through the conductor plates a magnetic field is set up between the plates which tends to separate the plates. The high currents required to be conducted for certain research forces the plates apart with such a force that they would be dangerous to personnel and also would destroy the electrical connections and crush the insulation. Thus, means must be provided to hold the plates together. The parallel conductor plates are made with a plurality of suitably spaced, aligned holes therein through which suitably insulated bolts or studs pass to aid in holding the conductor plates together. The electromagnetic forces produced during current flow through the conductors result in unit pressures which are not practical to be confined by bolts or studs alone (i.e., the number and density of bolts would become so high that not enough area would be left in the conductor plates for the current to flow). This problem is solved by dissipating most of the energy in the mass of steel bars on each side of the conductor plates. The steel bars on the upper conductor plate are insulated from the studs and nuts on the studs by phenolic insulation which adds additional mass above the conductor plates. The phenolic insulators have steel plates thereon which provide a stable bearing surface for steel sleeves which fit around the studs. The steel sleeves act to lengthen the bolts and also are designed to fail in compression prior to failure of any of the bolts. The steel bars on the lower side of the bottom conductor plate rest on a table top to which the bolts secure the conductor plate assembly. The steel top table also acts as ground which does not require any insulation between the lower steel bars and the bottom conductor plate. Additional mass and energy absorption is provided by lead bars placed below and above the above-described assembly.

Now referring to the drawings, wherein like reference characters refer to like parts throughout, there is shown by illustration a high current collector plate assembly made in accordance to the teaching of this invention. As shown, the high current collector plate assembly includes parallel upper and lower electrical conductor plates 20 and 21 of about one inch thick brass or copper separated from each other by sheets of Mylar insulation 22 to provide an insulation thickness of about thirty mils between the plates, which is sufficient to withstand voltages of 20 kilovolts. For higher voltages, insulation of greater thickness should be used. The conductor plates are each made in two sections and joined at the center to provide one continuous surface. Each conductor plate is provided with spaced holes 23 of about four inches in diameter and arranged to align with each other when the conductor plates are positioned in parallelism, as shown. The conductor plates are connected at one end to a suitable source by use of a plurality (14) of terminal plates and at the other end to a suitable load. The upper conductor plate 20 is cut away near the source end to receive a flat 2″ x 9″ x 14″ terminal plate 24 of a terminal assembly and to provide an upwardly extending ridge or lip 25 along the end of the plate to which the terminal plate 24 is mechanically connected by suitable 3/8–16 x 1″ bolts 26 spaced one inch apart and held in place by lock washers 27. The terminal plate assembly is formed by the terminal plate 24 which is secured to the upper conductor plate within the cut-away portion near the end of the upper conductor plate and a 5/8 inch thick, 13 3/8 inch wide, 12 inch high flat plate source connector 28 that is welded or brazed to the outer end of the terminal plate 24. The terminal plate 24 is cut away along the outer bottom edge such that the upper portion extends over the connection between the terminal plate and the lip of the upper conductor plate. The flat plate source terminal connector 28 is provided with a plurality (105) of holes 31 having 3/4″ pipe threads and arranged in vertical and horizontal rows of eleven and ten holes each with the vertical holes in adjacent rows being offset such that the first and third and second and fourth rows are in alignment vertically with two inches between centers and with 1 1/4″ centers along the horizontal rows. The high voltage side 32 of a standard coaxial cable 33 from the source is connected with each hole by a suitable connector. The connector is formed by common copper tube reducer adaptors 34 which are threaded on each end 35 and 36. The end 35 screws into the hole in the terminal connector plate 28 forcing the end in with a tight fit. The inner end of end 36 is reamed out to form an inset within which a metal ring 37 is forced tightly against the end of the coaxial cable and against the adaptor by a nut 38 threaded onto the end 36 of the adaptor. Electrical contact is made between the coaxial cable and the source terminal connector plates through the metal ring 37 and the adaptor 34.

The ground side of the coaxial cable is connected to a flat connector plate 41 similar to the high voltage source connector plate 28 and spaced therefrom in parallelism by about five inches and which contains threaded holes 31 therein which aligns with the high voltage connector holes in the flat plate terminal 28. The ground side 42 of the coaxial cable is connected to the flat plate connector 41 by use of adaptors 34 that screw into the holes 31, as described for the electrical connection for the high voltage side. The ground side flat plate connector 41 is secured to the outer end of the lower conductor plate 21 by use of 3/8–16 x 3″ bolts 43 spaced one inch apart and lock washers 27. The bolts 43 also connect the outer end of a steel bar 44 electrically with the lower plate and is spaced therefrom by a steel bar 45. The steel bar 44 has a portion which parallels the bottom surface of the lower plate and a portion that extends upwardly along the outer end through which the bolts 43 pass. The portion of the steel bar 44 that parallels the lower plate is also secured to a steel table top 46 upon which the conductor plate assembly is assembled by 1″–8 x 1 1/2″ bolts and suitable lock washers spaced on eight inch centers.

The opposite ends of the conductor plates 20 and 21 are connected to a single turn BeCu coil by use of suitable electrical connectors. As shown, the brass conductor plates 20 and 21 end adjacent to parallel beryllium-copper plates 47 and 48 which have a high conductivity and mechanical strength and extend the length of the conductor plates and are formed with the adjacent ends the same thickness as the conductor plates. The overall thickness of 1 7/8″ provides a rugged plate which will resist electromagnetic forces applied thereto during operation. Electrical connection is made between the brass conductor plates 20 and 21 and the beryllium-copper plates by elongated, parallel, 1 x 7 3/8″ brass or copper plates 51 and 52 which overlap the adjacent ends of the beryllium-copper plates and the conductor plates 20 and 21. The parallel overlapping plates 51 and 52 extend the entire length of each half of the conductor plates and along the beryllium-copper. The overlapping plates are secured to the beryllium-copper plates by 3/8–16 x 1 3/4″ bolts 53 and lock washers 27 and to the adjacent overlapped end of the conductor plates by 3/8–16 x 1 3/8″ bolts 54 which are recessed into the plates to provide a smooth outer plate surface. The bolts are placed along the length of the overlapping plates with one inch on center. The outer adjacent edges of the beryllium-copper plates are cut out and connected to the single turn coil 55 by 3/8–16 x 1 1/2″ bolts 56 at one inch on centers to complete the electrical connection between the conductor plates, the beryllium-copper plates, and the coil. Teflon insulators 57 are placed within the space between the adjacent edges of the beryllium-copper plates and the conductor plates, as well as between all joints to protect the Mylar from damage by arcing during discharge through the conductor plates.

Operation at high voltages creates magnetic fields which tend to separate the plates during operation, therefore steps must be taken to prevent separation of the plates. With current discharges greater than ten million amperes, the electromagnetic forces produced during current flow result in unit pressures which are too great to confine the plates by bolts only. This problem is solved by dissipating most of the energy of the impulse in accelerating steel blocks and other masses which are placed on opposite sides of the conductor plates. The conductor plates have a thickness of about one inch, with the width of the upper plate about 37 inches and the width of the lower plate about 42 inches. The length of each plate section is about 113 inches and they extend to the center of the assembly where they are joined together by 1/4–20 x 3/4″ screws 58 which pass through a 1/8 x 1″ steel strip 59 that extends across the width of the plates and then screw into an 11/16 x 1″ steel strip 60 that extends across the width of the plates. The strip 60 is inset and assembled on the side of the conductor plates that are adjacent to each other so that they do not protrude beyond the level of the conductor plates.

Insulated bolts or studs 61 pass through the aligned holes in the plates and are used to hold the conductor plate assembly together by use of suitable lockwashers and nuts 61a. The holes across the width of the conductor plates are on about seven inch centers and along the length are on about eight inch centers, except at the outmost ends along the load edge in the vicinity of the plates that are not connected to the coil where the centers are sixteen inches. The arrangement of bolts is shown in FIG. 10. Each bolt is provided with an insulating sleeve 62 of nylon positioned in the vicinity of the conductor plates. Each of the nylon insulating sleeves has circular sharp pointed protrusions 63 which extend between the layers of Mylar insulation between the conductor plates 20, 21 to increase the insulating path by a large factor between the conductor plates at the bolt holes. The insulator sleeves are also provided with a tooth-like surface 64 which effectively increases the insulating path to prevent electrical current creepage along the insulator. As shown in FIG. 1, the mass of energy absorption material differs at the junctions of the ends of the conductor plates. As shown, there are two steel plates 65 and 66 below the beryllium-copper plates that fit over the stud 61 and are approximately the width of the beryllium-copper plates and are in two sections which extend the same length. The bottom steel plate 66 rests on the table top 46. Above the beryllium-copper plate is located a steel plate 67 of about the width of the bottom steel plates 65, 66, which also extends the length of the beryllium-copper plates. The next studs 61 in line across the width of the assembly have the overlapping plates 51 and 52 on opposite sides of the conductor plates 20, 21; below plate 52 is located steel plate 68 that rests on the table top and above plate 51 is a steel plate 69. About the next three studs in alignment across the width of the plates are found steel plates similar to plates 68 and 69 wherein the plate 68 rests on the table. The last bolts in line across the width adjacent to the end of the plates to which the source terminal plates are connected have plates similar to plates 68 and 69 on the bottom of the lower plate. Above the terminal plate 24, as well as above the steel plates 67 and 69, are located four layers of ¾ inch thick phenolic insulation plates 71 which have tooth-like inner and outer surfaces 72 and 73 which act to lengthen the surface to prevent electrical current creepage along the insulation. Steel plates 74 are placed above the phenolic insulation and used to provide a stable bearing surface for the three inch steel sleeves 75 that are placed around the bolts. Steel sleeves 75 are also provided below the table top, the purpose of steel sleeves 75 being to effectively extend the total length of the bolts by six inches, the length of the two sleeves, and to provide a safety factor in case of excessive energy impulse beyond the design strength of the bolts.

In case the Mylar breaks down all of the current would flow through the point of breakdown. The concentration of current would result in excessive electromagnetic forces in that area beyond the design strength of the bolts. Thus the sleeves 75 are designed to fail in compression before the bolt fails in tension. Therefore, under excessive forces the sleeves would collapse and release the stress in the bolts in the area of the excessive force.

In addition to the energy absorbing steel plates and bolts there is provided on each side of the assembly about 22 tons of lead which helps to hold the assembly together by absorbing some of the energy caused during the discharge of a high current through the conductor assembly. The lead bars are not shown for simplicity of the drawings.

Figure 5:
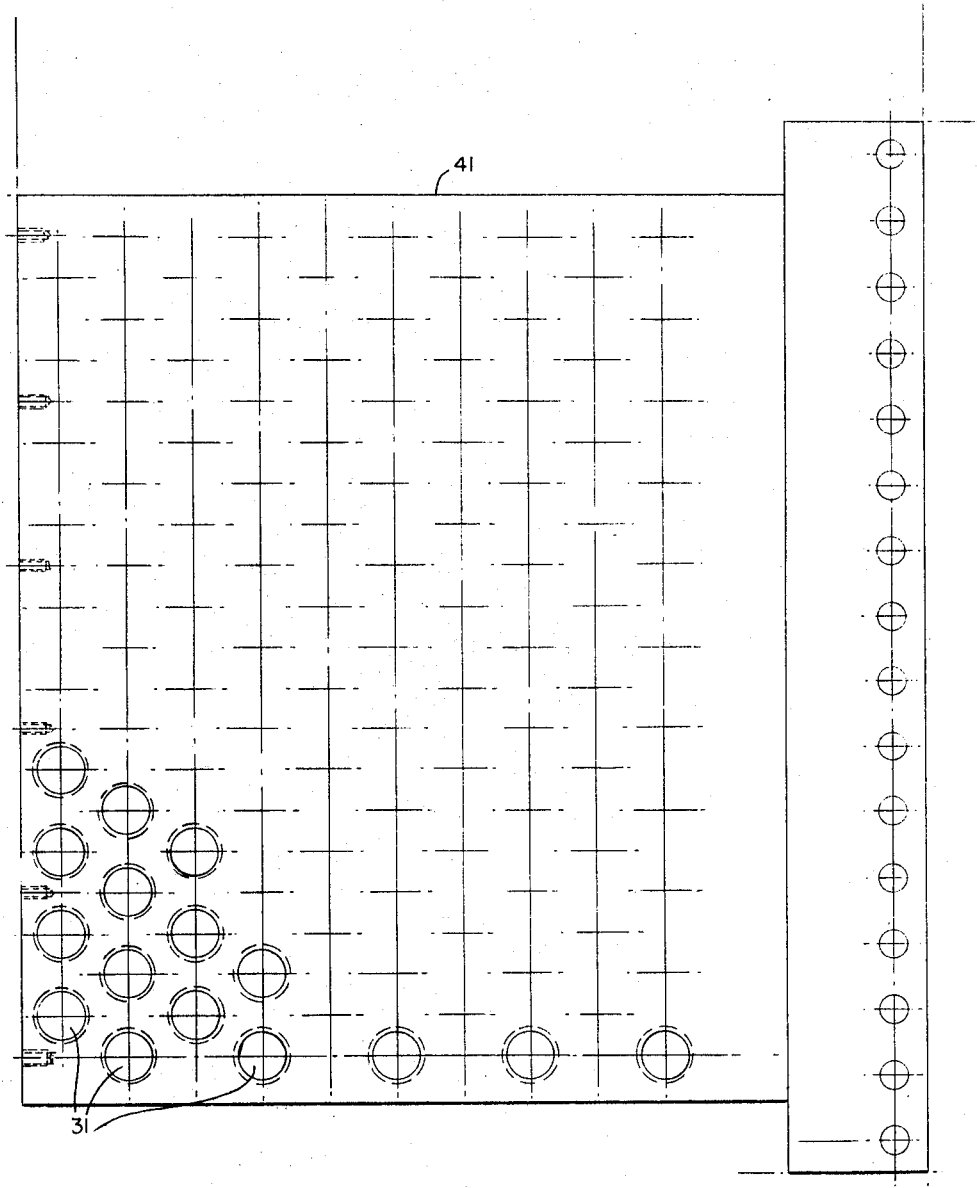
FIG. 5 illustrates an end view of the terminal plate which is connected with the ground side of the source.

In delivering currents greater than ten megamps, there is provided a capacitor source of about two million joules, not shown for simplification of the drawings. In order to transmit the current from the source to the terminal plates, there are required about 1500 coaxial cables connected therebetween. These cables are connected to a plurality (14) of terminal plates, each of which is shown with 105 holes for receiving the cables as shown in FIG. 5. The current flow in these cables creates magnetic fields about the cables in the vicinity of the terminal plates. Therefore an insulated flux bar 76 is placed between the bottom coaxial cables, and the bottom conductor plate. Also, flux bars 77 reduce inductance and also prevent the cables from moving under the effect of the magnetic forces. The parallel terminal plates 28 and 41 are held together at the top by an elongated flat plate 78 that is connected to the terminal plates 28 and 41 by ¼–20 x ¾" bolts.

In operation, the conductor plate assembly is assembled, connected electrically to the capacitor source at one end by use of coaxial cables and to the load at the opposite end by use of suitable connector bars bolted thereto. The capacitor source is discharged through the coaxial cables to the conductor plate assemblies where the current is fed from the high voltage side of the coaxial cables through the upper conductor plate and upper beryllium-copper bar to one side of the load, through the load, the bottom conductor plate, the ground terminal plate and back to the source. The bottom conductor plate is not insulated from the steel bars adjacent thereto, therefore the bottom steel bars, as well as the table top, are at ground level electrically.

The high current conductor plate assembly makes possible the use of a two million joule capacitor bank source to produce a current greater than ten million amperes which is fed through about 1500 coaxial cables and through the conductor plate assembly electrically connected to the conductor plates. The conductor plate assembly is of low inductance between 2 and 3 milli-microhenries and capable of withstanding high transient potentials and has a mechanical strength to withstand the production of magnetic fields of several hundred kilogauss. To meet low inductance criteria the insulation between the plates is about thirty mils therefore, precautions must be taken to prevent abrasive particles from getting between the plates and the Mylar insulation. Thus, the adjacent surfaces of the conductor plates must be hand polished and free of any protrusions, depressions and insured against any metal or dust particles being left on the surface. An electrical discharge through the assembly separates the conductor plates an amount equal to the elongation of the studs due to stress, and the spring action of the bolts forces the conductor plates back together at the end of the impulse due to electromagnetic forces produced during discharge of the capacitors. If dust or metallic particles are between the conductor plates and Mylar insulation, the insulation will be weakened due to slapback of the conductor plates. Electrical breakdown of the insulation produces a short which could cause the conductor assembly to blow up. The use of bolts only to hold the conductor plates together would require so many holes in the plates that not enough area would be left to carry the current. Therefore, the steel plates below and above the conductor plates are used to provide mass which permits the use of fewer studs. During the impulse of a capacitor discharge the resistance of the studs is small compared to the resistance of the mass of the steel blocks. Therefore the design of the studs idealizes the diameter to length ratio to provide a minimum of lost area in the conductor plates and at the same time limit the length of the studs. The longer the studs, the greater the separation between the conductor plates during an impulse since elongation of the studs is proportional to the length. Thus, the length of the studs must be kept to a minimum.

The effective length of the studs is increased by use of the circular sleeves at each end which is under compression between the stud nuts and the outer steel plates upon which the sleeves rest. Under excessive forces in the plate assembly, the sleeves are designed to fail in compression prior to failure of the studs in tension. Collapsing of the sleeve will relieve the stress in the bolt in proportion to the ratio of travel permitted the conductor plates after sleeve failure to that permitted prior to sleeve failure, this ratio being a factor of about 30 due to an additional travel of approximately three inches upon rupture of a sleeve as compared to a travel of about 0.1 inch prior to failure. Thus the present conductor plate assembly provides a suitable means of transmitting high currents and also provides a safety factor to prevent injury to personnel and damage to equipment.

Obviously many modifications and variations of the present invention are possible in the light of the above teachings. It is therefore to be understood that within the scope of the appended claims the invention may be practiced otherwise than as specifically described.

What is claimed is:
1. A current collector plate assembly which comprises:
first and second elongated, wide, electrical conductor plates secured in parallelism adjacent to each other in alignment,
said conductor plates being long compared to their width,
a plurality of aligned apertures in said first and second conductor plates,
a thin electrical insulating material separating said first and second conductor plates,
said insulation extending into said aperture,
an insulated stud passing through each of said aligned apertures,
an insulating sleeve secured about each of said insulated studs,
said insulating sleeve having a protrusion thereon matching with said plates and ridges on the sleeve which effectively increases its insulating characteristics, and a plurality of blocks secured on opposite sides of said parallel plates and held in position by said studs.

2. A current collector plate assembly which comprises:

first and second elongated, wide electrical conductor plates secured in alignment adjacent to each other in parallelism, said conductor plates being long compared to their width, a plurality of aligned apertures in said first and second plates, a thin electrical insulating material separating said first and second conductor plates, said insulating material extending into said apertures, an insulated stud extending through each of said aligned apertures in said first and second conductor plates and adapted to secure said conductor plates relative to each other, a sleeve of insulating material secured about each of said studs in the vicinity of said aligned apertures in said conductor plates, said sleeve of insulating material including a protruding portion about the circumference thereof, said protruding portion mating with said insulating material between said first and second plates, said sleeve of insulating material including ridges along the outer surface extending from said protruding portion to each end thereof, a plurality of steel blocks secured along the outer surface of each of said first and second conductor plates, a plurality of insulating blocks secured outwardly of said steel blocks, a plurality of steel plates secured outwardly of said insulating blocks, a steel sleeve about each of said studs, and supported on said steel plates, nuts and washers on each end of said studs, said nuts and washers securing said steel sleeves in plate, said steel sleeves effectively extending the length of said studs, and said studs securing said conductor plates, said steel blocks, said insulating blocks, said steel plates and said steel sleeves together as an electrical conductor assembly.

3. A current collector plate assembly was claimed in claim 2 which includes means for connecting said conductor plates to an electrical source, and means for connecting said conductor plates to a load.

4. A current collector plate assembly capable of transmitting current load greater than 10 megamps suitable to produce 300 kilogauss for several hundred microseconds which comprises, first and second elongated, wide, brass electrical conductor plates, assembled in parallelism, said first and second conductor plates each comprising two half sections connected together at adjacent ends to form said conductor plates, a plurality of apertures in each of said conductor plates, said apertures in said first conductor plate aligning with corresponding apertures in said second conductor plate, insulating material separating said first conductor plate from said second conductor plate, a plurality of steel blocks positioned on opposite sides of said first and second conductor plates, said steel blocks having apertures therein adapted to align with said apertures in said conductor plates, insulating blocks positioned adjacent to said steel blocks outwardly thereof and having apertures that align with said apertures in said steel blocks and said conductor plates, a plurality of outer steel plates positioned adjacent to said insulating blocks outwardly thereof and having apertures therein that align with said apertures in said insulating blocks, said steel blocks and said conductor plate, an insulated stud in each one of said plurality of apertures, an insulating sleeve surrounding each of said studs in the vicinity of said conductor plates and said steel blocks, a protruding portion on each of said insulating sleeves extending into the insulating material between said conductor plates, ridges along said insulating sleeve surface to effectively increase the insulation path along said sleeve, a steel sleeve position about each of said studs near the other ends, a nut and washer on each of said studs, said washer being secured against said steel sleeve securing said steel sleeve between said washer and said outer steel plates, said nuts securing said plate assembly together, a source terminal connected with said first conductor plate, a ground terminal connected with said second conductor plate, and parallel plate connectors connected between said first and second conductor plates and a load to complete an electrical circuit from said source terminal through said load and back to said ground terminal.

5. A current collector plate assembly which comprises:

first and second elongated, flat, electrical conductor plates positioned relative to each other in parallelism, a plurality of apertures in each of said plate conductors, said apertures in said first plate conductor aligning with the apertures in said second plate conductor, a thin insulating material positioned between said plate conductors, insulated studs passing through each of said apertures in said aligned conductors, nuts and washers on each of said studs, said studs securing said conductor plates in parallelism, a mass of weight secured between said conductor plates and said washers and nuts on said studs, a source terminal connected with said first plate conductor, a ground terminal connected with said second plate conductor, a first plate connector connected to said first plate conductor and to one side of a load, and a second plate connector connected to said second plate conductor and to the other side of a load whereby current is directed from a source through said source terminal through said first plate conductor to the load, back through said second plate conductor and to the ground terminal and back to the source.

References Cited by the Examiner

UNITED STATES PATENTS

| 2,262,067 | 11/1941 | Togeson et al. | 307—157 X |
| 2,287,502 | 6/1942 | Togeson et al. | 307—147 |
| 2,439,956 | 4/1948 | Wagner et al. | 307—147 X |
| 2,884,547 | 4/1959 | Herrmann | 307—147 |

ORIS L. RADER, *Primary Examiner.*

MILTON O. HIRSHFIELD, *Examiner.*

T. J. MADDEN, W. M. SHOOP, *Assistant Examiners.*